2,901,454

ALKYL METHACRYLATE POLYMER COATING COMPOSITIONS AND METHOD OF MAKING SAME

Francis S. Stewart, Los Angeles, Calif.

No Drawing. Application July 22, 1952
Serial No. 300,332

3 Claims. (Cl. 260—32.8)

This invention relates to a new coating composition and to the method of making such coating composition, and particularly to such coating compositions and method of making the same containing acrylic resins or polymers.

Coating compositions of acrylic polymers or plastics in which the acrylic resin is present in solution in a solvent for the polymer are known but have the disadvantage that they contain only a low acrylic polymer or resin content without running into difficulties in coating. This is particularly true for spraying, where with the solution type of coating when a satisfactorily high resin content is used, coating difficulties such as cobwebbing appear, especially for a fast-drying coating. Coating compositions in which the acrylic plastic is in the form of an emulsion are also known but such coating compositions require an undesirable baking operation to form a homogeneous coating film. It has long been the desire of the art to which my invention relates to have an acrylic resin or plastic coating composition which will have a satisfactorily high resin content which can be applied as a coating without difficulty, particularly without such a difficulty as cobwebbing on spraying, and which will form a satisfactory coating merely by evaporation upon air drying, especially, for example, as is available in the well-known nitrocellulose lacquers.

In accordance with my invention, the discovery has been made that an acrylic resin or plastic coating composition can be made which has a satisfactorily high acrylic resin content, which can be applied without difficulty, particularly without the well-known difficulty of cobwebbing in spraying, even with a relatively high solids content and even with fast evaporating solvents, and which when applied forms a satisfactory coating merely by evaporation in air.

Moreover, the coating compositions made in accordance with this invention are stable on storage for long periods of time, for example, several years, even with high resin content. In addition, it is possible to make coating compositions in accordance with my invention with the particular acrylic monomers which upon polymerization yield hard, tough, resinous films. Such hard tough films may be obtained in accordance with my invention without the need of such modifying agents as hard gums, etc. now used in the art in attempting to obtain such desirable properties from the well-known solution type of acrylic resin coatings, and films of almost any desired thickness may be obtained because of the high solids content in the coatings of my invention, and such thick film can be applied by spraying without cobwebbing. In brushing applications, with the higher solids content, much labor can be saved in application because of the greater thickness of coating material which can be laid down with one brush coat. Moreover, the compositions of my invention have the outstanding property of being able to dry and harden even though the coating is applied in thick layers. Coatings of my invention may be applied in thicker layers than the thickness of the layers which can be applied where durable oil-type enamels are used. On such surfaces as metal, concrete, stucco, paper and wood, except wood subject to expansion and contraction as a result of wetting and drying, the resulting coatings of my invention have outstanding exterior durability, that is, they stand up well on weathering. Coating compositions of my invention containing water-soluble solvent polymerization permitter and inhibitor will form a satisfactory coating even under water, as the water-soluble solvent and inhibitor dissolve in the water, allowing polymerization to take place in the film as the concentration of the inhibitor in the film decreases. The tendency of the hard, tough acrylic resin coating to craze on aging appears to be eliminated from the coatings resulting from using the compositions of my invention when further polymerization in the film proceeds as the coated film dries.

In general, it has been discovered in accordance with the method of my invention that the coating compositions of my invention can be made by compounding a relatively high proportion of polymerizable monomer (that is, a monomer containing sufficient catalyst to cause a moderate rate of polymerization under the heat treatment to be described, which may be a sufficient amount of catalyst to overcome any polymerization inhibitor present in the commercial monomer); a volatile solvent for the acrylic monomer which permits polymerization of the monomer to form the polymers desired for a satisfactory coating and which preferably, after the evaporation of the inhibitor referred to below, permits polymerization to proceed to form high molecular weight polymers satisfactorily hard and tough as a coating, which solvent is miscible with the polymers and which reduces the rate of polymerization to facilitate its control; and an inhibitor to the formation of high molecular weight polymers, which inhibitor is miscible with said solvent, with said monomers, and with said polymers and which inhibitor satisfactorily evaporates in air from the coating composition preferably at a rate greater than that of the evaporation of said solvent, so that after the resulting coating composition is applied and said inhibitor has evaporated, further polymerization takes place in the presence of the yet unevaporated solvent until said solvent evaporates and disappears and polymerization is stopped by the inhibiting action of the oxygen in air.

This solution of polymerizable monomer, solvent and inhibitor is then heated to effect the desired polymerization. This is done by controlling the temperature and time of polymerization for any particular solution of said three components to obtain a substantially complete polymerization of the monomer and to obtain a polymeric material which, when made into a coating composition of spraying consistency and containing relatively high solids content, for example, of at least about 20 to 25 percent by weight of resin and when sprayed at elevated temperature from at least about 40 to 50 percent by weight of resin, does not cobweb. It is a significant feature of this invention that it is possible to obtain a product characterized by a polymerization of substantially all of the monomer (that is, to the extent that the monomer appears to have disappeared as determined by a test such as by heating in the open and weighing or by the characteristic odor of the monomer) and yet the resulting composition, even though containing a high acrylic resin content, can be sprayed at relatively high solids content without cobwebbing. Usually, such polymerization can be effected at temperatures from about 150 to 250° F. for a period of time from about ½ hour to 12 hours, it being understood in general that the higher the temperature the shorter the time. If exothermic heat of reaction causes an undue temperature rise, it may be necessary to extract heat from the reactants to control the temperature. Usually, it will be found desirable to carry out the heat treatment in a closed container equipped with a reflux condenser. If the resulting composition is too viscous for the intended method of application, such as spraying under particular conditions, it may be reduced and this is preferably done with a polymerization inhibitor such as that used in producing the concentrated composition. In general, the process for making the most desirable coating compositions of my invention requires a proper ratio of solvent polymerization permitter and polymerization inhibitor during the heat treatment as well as the proper amount of catalyst and the application of a proper heat cycle to the mixture of monomer containing catalyst, solvent permitter and inhibitor, with cooling before undesired overpolymerization takes place. In general, I have found it desirable to use about equal amounts of solvent and inhibitor. However, the relative proportion of solvent may be greater so long as the amount of inhibitor is sufficient to prevent the formation of undesirably large polymer molecules, especially those which produce cobwebbing on spray coating. Also, the relative proportion of inhibitor may be larger than an equal amount as long as the desired polymerization is obtained. The amount of both solvent and inhibitor taken together with respect to the monomers should be large enough so that the polymerization can be controlled to give the desired polymers. The ratio of solvent to inhibitor will differ somewhat with the particular solvent and inhibitor used. Moreover, the properties of final polymer in the dried film depend to some extent on the particular solvent and the particular inhibitor used. Since the resulting product, made in accordance with this invention, can be reduced with more polymerization inhibitor, by adding the desired quantity of inhibitor, it is possible to make a very stable solution which will not further polymerize until spread out into a film and the inhibitor evaporates to the point where further polymerization proceeds to give higher molecular weight polymers which form a hard, tough, durable coating upon evaporation of the volatile solvent polymerization permitter.

In general, the mixture of monomer containing catalyst, solvent and inhibitor will be heated to a temperature at which the exothermic reaction begins and then the temperature must not be allowed to rise to the point where undesired overpolymerization is obtained. Cooling control, as by circulating cold water around the walls of the container, may be found desirable.

The amount of catalyst used will, in general, be that required to give a satisfactory controllable rate of polymerization.

An alternative method of making coating compositions of my invention is to polymerize the monomer to the desired extent as above described, preferably in the solvent polymerization permitter alone and then add the desired amount of solvent and inhibitor or inhibitor, respectively, to make the desired composition.

The acrylic monomers which may be used in my invention are those acrylic monomers which, in general, form satisfactory coatings, especially those which form hard, tough and durable coatings. In particular, this includes preferably the alkyl methacrylates in which the alkyl group has from 1 to 4 carbon atoms per group, for example, methyl methacrylate, ethyl methacrylate, propyl methacrylate, iso-propyl methacrylate, iso-butyl methacrylate and secondary butyl methacrylate. Normal butyl methacrylate may also be used. It makes an excellent coating for exterior wood having a high degree of permanent elasticity. To the extent that the corresponding acrylates make satisfactory coatings, they likewise may be used, particularly secondary butyl acrylate and cyclohexyl acrylate. Also to the extent that other methacrylates make satisfactory coatings, they too may be used.

The compositions of my invention comprise essentially polymers of the acrylic monomer in solution in a volatile solvent which permits further polymerization of the polymers to form polymers of higher molecular weight and in solution in an inhibitor to such further polymerization which in an applied coating evaporates more rapidly than said solvent, leaving a film of polymers and volatile solvent in which such further polymerization takes place to form a satisfactory coating. The polymers in such solution preferably are of sufficiently low molecular weight that the composition does not cobweb on spraying, even at relatively high solids content, and even though fast-drying solvents, such as in the examples below, are used and are of sufficiently high molecular weight that the polymers do not evaporate from the coated film during application and drying.

The volatile solvents used in accordance with my invention will usually have a vapor pressure of at least 0.07 mm. of Hg at 20° C. at atmospheric pressure of 760 mm. of Hg, and preferably will have such a vapor pressure of at least 0.1 mm. of Hg at 20° C.

The following specific examples will further illustrate my invention:

*Example 1*

3.65 lbs. of ethyl methacrylate monomer (containing 0.006% hydroquinone polymerization inhibitor and added 0.55% of benzoyl peroxide polymerization catalyst) was mixed and dissolved with 2.74 lbs. n-butyl alcohol and 2.74 lbs. toluene. Polymerization was effected by heating at a temperature range of 160–187° F. for one hour and thirty-four minutes, and then the mixture was cooled with cold water applied to the outside of the container to about 100–130° F. in about three-quarters of an hour.

The resulting composition was at a brushing viscosity but too viscous for spraying and therefore in order to test it in spray coating a sample was diluted with 60 parts of the toluene inhibitor per 100 parts of product to reduce it from 40% by weight of solids to 25% by weight of solids to give a spraying composition which could be sprayed at room temperature. This reduced product sprayed very satisfactorily without any evidence of cobwebbing. The sprayed coat dried in air with satisfactory rapidity. At a temperature of about 75° F. the coating was tack-free in about two to three minutes. The coated film dried with the speed of nitrocellulose lacquers, and had the additional advantage of becoming hard in a shorter period of time than a similar film of nitrocellulose lacquer.

Solution with n-butyl alcohol instead of toluene will give a reduction of stickiness of spray dust upon spraying.

*Example 2*

25 lbs. of ethyl methacrylate monomer (containing 0.006% hydroquinone polymerization inhibitor and added 0.25% of benzoyl peroxide polymerization catalyst) was mixed and dissolved with 3 lbs. 2¼ oz. of diacetone alcohol and 3 lbs. 2¼ oz. of Shell TS-28, a fast-evaporating unsaturated petroleum hydrocarbon thinner having a distillation range of 318° F. (initial) to 375° F. (dry point, average) and a 57.0 volume percent of unsaturates (aromatics, ASTM Method). Polymerization was effected by heating at a temperature range of 200–265° F. for one hour, and then the mixture was cooled with water applied to the outside of the container to about 100–130° F. in about a half hour.

The resulting composition was too viscous for spraying and therefore in order to test it in spray coating, a sample was diluted or reduced by the addition of 167 parts of TS-28 per 100 parts of the product to give a spraying composition which could be sprayed at room temperature and which contained 30 percent by weight of solids or resin. This reduced product sprayed very satisfactorily without any evidence of cobwebbing. The sprayed coat dried in air with satisfactory rapidity. At a temperature of about 75° F. the coating was tack-free in about thirty minutes. After the coating had been applied, the TS-28 evaporated at a rate faster than the diacetone alcohol, leaving, toward the end of the drying, a film composed substantially of polymers and diacetone alcohol which then dried into a very satisfactory hard and tough coating. The dried coating could not be dissolved by the TS-38, showing that further polymerization had taken place in the drying film.

Another sample reduced to 50 percent solids content with TS-28 was used for impregnating and coating paper by the silk screen method. The film dried with satisfactory speed and gave dimensional stability to the paper with respect to exposures to changes in relative humidity and even to subjecting to wetting with water.

The undiluted product of this example is exceedingly viscous and usually it will therefore be desirable to use less of the ethyl methacrylate monomer. This example, however, illustrates the production of a composition of very high solid content.

*Example 3*

145 lbs. of ethyl methacrylate monomer (containing 0.006% hydroquinone polymerization inhibitor and added 0.55% of benzoyl peroxide polymerization catalyst) was mixed and dissolved with 109 lbs. of methyl ethyl ketone (volatile solvent) and 109 lbs. of toluene (polymerization inhibitor).

Polymerization was effected by heating with stirring at a temperature range of 175–186° F. for one hour and fifteen minutes and then the mixture was cooled with cold water to about 100–130° F. in about an hour.

In order to test the resulting product in spray coating, a sample of the resulting product was diluted or reduced by the addition of 33 parts of n-butyl alcohol per 100 parts of the resulting product to give a spraying composition having 30 percent solids or resin content. This reduced product sprayed very satisfactorily without any evidence of cobwebbing. The sprayed coat dried in air rapidly at a speed comparable with the drying of fast-drying nitrocellulose lacquers. At room temperature the coating was tack-free in a few minutes.

In the composition of this example, the methyl ethyl ketone evaporates at a greater rate than toluene from the applied coating but the n-butyl alcohol evaporates at a slower rate than the toluene, and in addition alone will permit further polymerization of the polymer. Accordingly, toward the end of the drying of the coated film, the film was composed substantially of polymers and n-butyl alcohol which, upon the evaporation of the n-butyl alcohol, left a satisfactory hard, tough coating. In this composition the n-butyl alcohol performs the function of the solvent permitting polymerization to continue after the toluene inhibitor evaporated. The methyl ethyl ketone in this example was used as the solvent during the process of polymerization to produce the desired polymeric composition, but the most satisfactory coating composition was not made until the addition of the n-butyl alcohol which evaporates at a lower rate than the toluene. Accordingly, it is apparent that satisfactory polymeric products can be produced in accordance with my invention by means of a solvent which evaporates at a rate faster than the polymerization inhibitor, such as toluene, and that the preferred coating composition can then be made by the addition of another solvent which permits polymerization and which evaporates at a lower rate than the polymerization inhibitor. Since n-butyl alcohol permits polymerization, reduction with n-butyl alcohol should not be made with such a large proportion thereof as to materially impair the function of the polymerization inhibitor, such as the toluene of this example: Further reduction beyond such point should be made with a polymerization inhibitor such as toluene or Shell Spirits No. 2, preferably one which also evaporates faster than the solvent polymerization permitter, such as the n-butyl alcohol.

The dried coatings made with the compositions of this example were hard, tough, and durable. They could be sanded in a finishing system in about fifteen minutes and could be rubbed in about an hour to give a satisfactory rubbed finish on furniture.

The property of stability in storage of the composition of this invention either before or after addition of the n-butyl alcohol is very good. No deterioration has been observed in storage of either one for a period of over five months. Pigments disperse readily by grinding and give fast drying pigmented coatings.

*Example 4*

25 lbs. of ethyl methacrylate monomer (containing 0.006% hydroquinone polymerization inhibitor in the commercial product and 0.53% (60 grams) of benzoyl peroxide polymerization catalyst) was dissolved in 3 lbs. 2¼ oz. of diacetone alcohol and 3 lbs. 2¼ oz. of pure gum turpentine in a five-gallon tin container at room temperature. The monomer was polymerized by heating at a temperature range of 180–255° F. for one and three-quarter hours, and then cooled with cold water to room temperature in about one hour. All the monomer was polymerized.

Because of the high solids content, the resulting product was too viscous for brushing or spraying application and was therefore thinned with 128 parts of pure gum turpentine per 100 parts of product to give a spraying composition which could be sprayed at room temperature and which contained 35 percent by weight of solids or resin. This reduced product sprayed very satisfactorily without any evidence of cobwebbing. The sprayed coat dried in air with satisfactory rapidity. At a temperature of about 75° F. the coating was tack-free in about thirty minutes. After the coating had been applied, the turpentine evaporated at a rate faster than the diacetone alcohol, leaving, toward the end of the drying, a film composed substantially of polymers and diacetone and alcohol which then dried into a very satisfactory hard and tough coating. The dried coating could not be dissolved by turpentine, showing that further polymerization had taken place in the drying film to form polymer molecules of sufficiently high molecular weight insoluble in turpentine.

Because the composition of this example contains turpentine, it can be used over a coating containing drying oils without the necessity of removing such coating. The dried coating of this invention, however, is not soluble in and cannot be removed with turpentine because of the additional polymerization which takes place in the coating between the time of the evaporation of the turpentine and the evaporation of the diacetone alcohol.

*Example 5*

1.82 pounds of ethyl methacrylate monomer containing 0.26 pound of benzoyl peroxide catalyst and 0.006% hydroquinone was dissolved in 1.34 pounds of Shell Spirits No. 2 and 2.98 pounds of di-isobutyl ketone and 0.32 pound of 2-ethylhexanol. This was heated in a water-jacketed container for one hour 15 minutes with cooling to maintain the temperature below about 220° F. and at about 210–220° F. A satisfactory solution was obtained having a solid content of 25%. Shell Spirits No. 2 is an aliphatic petroleum solvent having an aromatic Stoddards value of 2% by volume and an initial boiling point of 304° F., and final boiling point of 364° F., conforming to Federal Specification PS–661–EM–1.

In this example the volatile solvent permitter is the di-isobutylketone and 2-ethylhexanol and the inhibitor is the Shell Spirits No. 2. All these solvents are insoluble in water, and therefore the wet applied film is not affected by water or very high relative humidity.

This composition when applied with a brush, dries without brush marks showing. It is tack free in about a half hour. When pigmented with white-free pigments, such as chromium oxide, iron oxide, burnt umber, it has an unusually long life on exterior exposure in either a glossy or flat formulation.

As used herein the term volatile solvent polymerization permitter means a volatile solvent in the presence of which polymerization will take place, and volatile solvent polymerization inhibitor is one in which polymerization is inhibited, which polymerization in the absence of the inhibitor would take place as in the permitter. These terms apply to the combination of volatile solvents as present in the coating composition. During the process of making the coating composition as disclosed, the monomer is polymerized in spite of the polmerization inhibitor by raising the temperature, but when the coating composition is applied in a film, as by spraying or brushing, polymerization is inhibited and permitted by the solvent inhibitor and volatile solvent permitter, respectively.

The foregoing describes my invention in its preferred aspects, and illustrates my invention by way of specific embodiments and specific examples, but alterations and modifications may be made thereof without departing from the invention herein disclosed and claimed.

This application is a continuation-in-part of my co-pending application, Serial No. 75,491, filed February 9, 1949, now abandoned.

I claim:

1. A coating composition comprising further polymerizable polymers of alkyl methacrylate, the alkyl portion of which has from one to four carbon atoms admixed with polymerization catalyst and dissolved in a volatile solvent vehicle comprising a volatile solvent polymerization permitter means which in the absence of polymerization inhibitor permits further polymerization of said further polymerizable polymers, said mixture of polymers, catalyst and solvent being such that further polymerization at said polymers will take place under conditions of coating application in the absence of polymerization inhibitor, and a sufficient proportion of volatile solvent polymerization inhibitor means to inhibit further polymerization of said further polymerizable polymers under conditions of coating application even in the presence of said polymerization permitter, said polymers admixed with polymerization catalyst being capable of further polymerization without said polymerization inhibitor in an applied coating and being of sufficiently high molecular weight that there is substantially no evaporation thereof on application and drying of the coating composition but not of sufficiently high molecular weight to cobweb on spraying when present to the extent of 20% by weight of the composition, said polymerization catalyst being present in sufficient proportion to cause said polymers to further polymerize in the presence of said volatile solvent polymerization permitter when said coating composition is applied, upon removal of said volatile solvent polymerization inhibitor, and said volatile solvent polymerization inhibitor evaporating from the applied coating at a greater rate than said volatile solvent polymerization permitter so that upon application of the coating composition the concentration of polymerization inhibitor in the applied coating will be reduced by evaporation of said inhibitor at a greater rate than the evaporation of said permitter from the applied film leaving a film of such relatively reduced concentration of polymerization inhibitor that said further polymerizable polymers admixed with polymerization catalyst will further polymerize and produce a hard and tough polyalkyl methacrylate resin film from which said volatile solvent polymerization permitter evaporates leaving a dry, hard and tough polyalkyl methacrylate resin film coating, said volatile solvent polymerization permitter being a mixture of di-isobutyl ketone and 2-ethylhexanol and said volatile solvent polymerization inhibitor being a light petroleum aliphatic hydrocarbon solvent.

2. The composition as defined in claim 1 in which said alkyl methacrylate is ethyl methacrylate.

3. The process of making an acrylic resin coating composition which comprises partially polymerizing alkyl methacrylate monomer, the alkyl portion of which has from one to four carbon atoms, with polymerization catalyst at elevated temperature in solution in a solvent vehicle for resulting polymers, said solvent vehicle comprising a volatile solvent polymerization permitter means in which further polymerization of said polymers with said polymerization catalyst will take place under conditions of coating application in the absence of polymerization inhibitor and a volatile solvent polymerization inhibitor means which inhibits further polymerization of said polymers with said polymerization catalyst under conditions of coating application even in the presence of said polymerization permitter and which evaporates at a faster rate than said volatile solvent polymerization permitter, said partial polymerization being effected at a temperature sufficiently high to overcome the polymerization inhibiting effect of said inhibitor and said partial polymerization being carried out to form polymers in solution in said volatile solvent vehicle of sufficiently high molecular weight that there is substantially no evaporation thereof on application and drying of the coating composition but not of sufficiently high molecular weight to cobweb on spraying when present to the extent of 20% by weight of the composition, said polymerization catalyst being present in sufficient proportion to effect said partial polymerization and to effect further polymerization of said resulting polymers under conditions of application upon removal of said volatile solvent polymerization inhibitor, said volatile solvent polymerization permitter being a mixture of diisobutyl ketone and 2-ethylhexanol and said volatile solvent polymerization inhibitor being a light petroleum aliphatic hydrocarbon solvent.

References Cited in the file of this patent

UNITED STATES PATENTS

| | | |
|---|---|---|
| 2,204,517 | Strain | June 11, 1940 |
| 2,406,558 | Neumann | Aug. 27, 1946 |
| 2,475,626 | Leatherman | July 12, 1949 |